United States Patent [19]

Akita et al.

[11] Patent Number: 4,477,766
[45] Date of Patent: Oct. 16, 1984

[54] APPARATUS FOR CONTROLLING ELECTRIC GENERATION FOR VEHICLES

[75] Inventors: Yoshio Akita, Chiryu; Takanori Teshima, Kariya; Koshi Torii, Iwakura; Toshinori Maruyama, Kariya, all of Japan

[73] Assignee: Nippondenso Co., Ltd., Kariya, Japan

[21] Appl. No.: 352,063

[22] Filed: Feb. 24, 1982

[30] Foreign Application Priority Data

Feb. 26, 1981 [JP] Japan .................................. 56-27509

[51] Int. Cl.$^3$ ............................ H02J 7/14; H02J 7/24
[52] U.S. Cl. ...................................... 322/28; 322/99; 320/64
[58] Field of Search .................... 322/28, 99; 320/39, 320/64, 68, 61

[56] References Cited

U.S. PATENT DOCUMENTS

| | | | |
|---|---|---|---|
| 3,983,471 | 9/1976 | Itoh et al. | 322/28 |
| 4,263,543 | 4/1981 | Watrous et al. | 322/28 X |
| 4,310,793 | 1/1982 | Sheldrake et al. | 322/28 |
| 4,346,337 | 8/1982 | Watrous | 322/28 X |
| 4,360,772 | 11/1982 | Voss | 322/99 X |

Primary Examiner—R. J. Hickey
Attorney, Agent, or Firm—Cushman, Darby & Cushman

[57] ABSTRACT

An apparatus for controlling electric generation for vehicles for use in an electric generating apparatus for a vehicle having a battery comprising a generator and an electric generation display device comprises: a first comparator circuit for comparing a detection value of the battery voltage with a first reference control voltage so as to charge the battery appropriately; an electric generation display control circuit for driving the electric generation display device in response to an output signal of a second comparator circuit for comparing a detection value of an electric generation voltage of the generator with a second reference control voltage; a third comparator circuit for comparing the detection value of the electric generation voltage of the generator with a third reference control voltage which is higher than the second reference control voltage; and means for driving an exciter circuit of the generator which receives the output signals of the first and third comparator circuits and operates to drive the exciter circuit only in at least one of the cases where the detection value of the battery voltage is lower than the first reference control voltage and where the detection value of the electric generation voltage of the generator is lower than the third reference control voltage, respectively. The use of this electric generation control apparatus for vehicles makes it possible to prevent the electric generation display device from malfunctioning to display a state of no electric generation in spite of a continuing electric generating operation of the generator.

5 Claims, 2 Drawing Figures

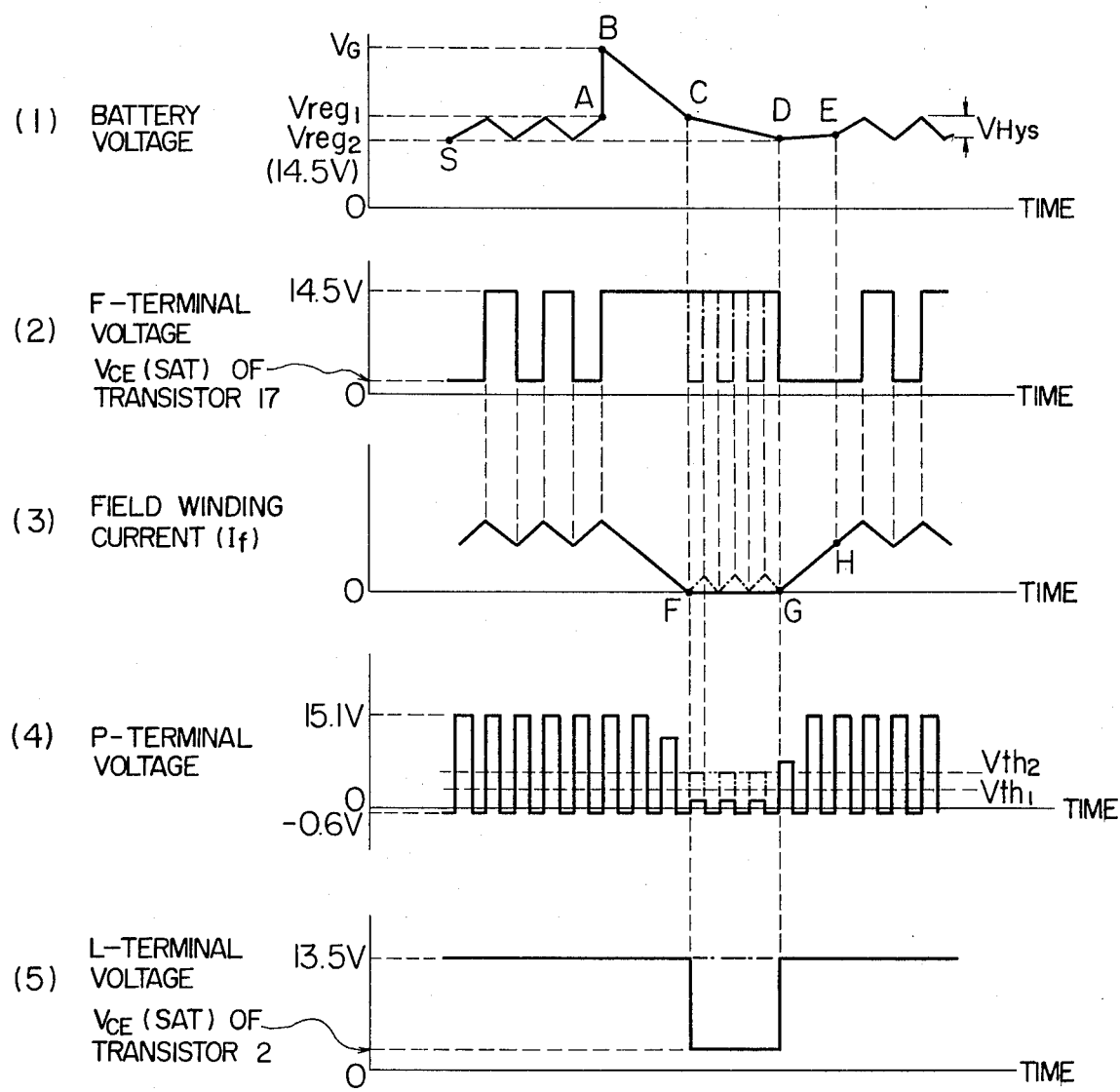

APPARATUS FOR CONTROLLING ELECTRIC GENERATION FOR VEHICLES

BACKGROUND OF THE INVENTION

1. Field of the Invention

The present invention relates to an electric generation control apparatus for a vehicle generator having an electric generation display device, or more particularly to a control apparatus for smoothly operating the electric generation display device even when a load on the generator changes suddenly.

2. Description of the Prior Art

An electric genration control apparatus for use in an electric generator is generally known, wherein, during a period from the turning-on of a key switch to the time when the voltage generated by the generator reaches a predetermined value, a display lamp is lit to indicate a non-generating condition, and when electric generation is started by the generator and exceeds a predetermined voltage, the display lamp is put out to indicate an electric generating condition. In this generally known electric generator, when a battery is overcharged due to an external condition such as abrupt cut-off of a heavy load even during normal electric generation, the operation of the generator is interrupted by the electric generation control apparatus until an overcharged portion of the battery voltage is discharged, despite that an electric generating condition continues, resulting in a condition as if electric generation is stopped for this particular period, so that the display lamp is lit for this period by the electric generation display device, thereby giving a misleading indication to a vehicle driver.

SUMMARY OF THE INVENTION

Accordingly, it is an object of the present invention to provide an electric generation control apparatus for vehicles which prevents the above-mentioned malfunction and operates to give stable electric generation display by assuring prevention of the electric generation display device from operating in an electric genrating state and to make it operate only when electric generation is not effected.

The electric generation control apparatus according to the present invention has provision for making up for an incomplete function of the electric generation display part of the electric generation display device which assumes a non-operating state or an operating state in accordance with an electric generation detection signal from the electric generation detecting circuit for detecting whether the output voltate of the generator has reached a predetermined value or not. When the battery is in an overcharged state as in the case where a heavy load has been cut off, for example, a first detection signal based on the battery voltage tends to cause electric generation to be stopped. In this case, the electric generation detection signal is used as a second detection signal so that the electric generating condition is controlled by the second detection signal of a level higher than the level where the electric generation display circuit decides that electric generation has ceased and the electric generation display device is operated. For example, since the first detection signal is required to be responsive to a charging voltage of the battery, the electric generation control voltage of the first detection signal is set to 14.5 volts, while the second detection signal is not required to be responsive to the charging voltage of the battery, and therefore, if the operating voltage of the electric generation display device is 8 volts and below, the electric generation control voltage of the second detection signal is set to 10 volts which is higher than 8 volts. In this way, according to the electric generation control apparatus of the present invention, even when the battery is overcharged during the electric generating operation, the electric generation voltage of the generator does not become lower than the threshold operating voltage of the electric generation display device, so that the electric generation display device does not effect any malfunction and it is possible to assure that the electric generation display device does not operate in an electric generating state, but it operates only when electric generation is not effected, thus maintaining a stable operation.

BRIEF DESCRIPTION OF THE DRAWINGS

FIG. 2 shows operational waveforms at various parts of the apparatus of FIG. 1, in which solid lines show operational waveforms of conventional apparatuses and alternate long and short dash lines show specified parts of operational waveforms of the electric generation control apparatus for vehicles according to the present invention, which specified parts differ from the operational waveforms of the conventional apparatuses.

DESCRIPTION OF THE PREFERRED EMBODIMENT

Figure 1:
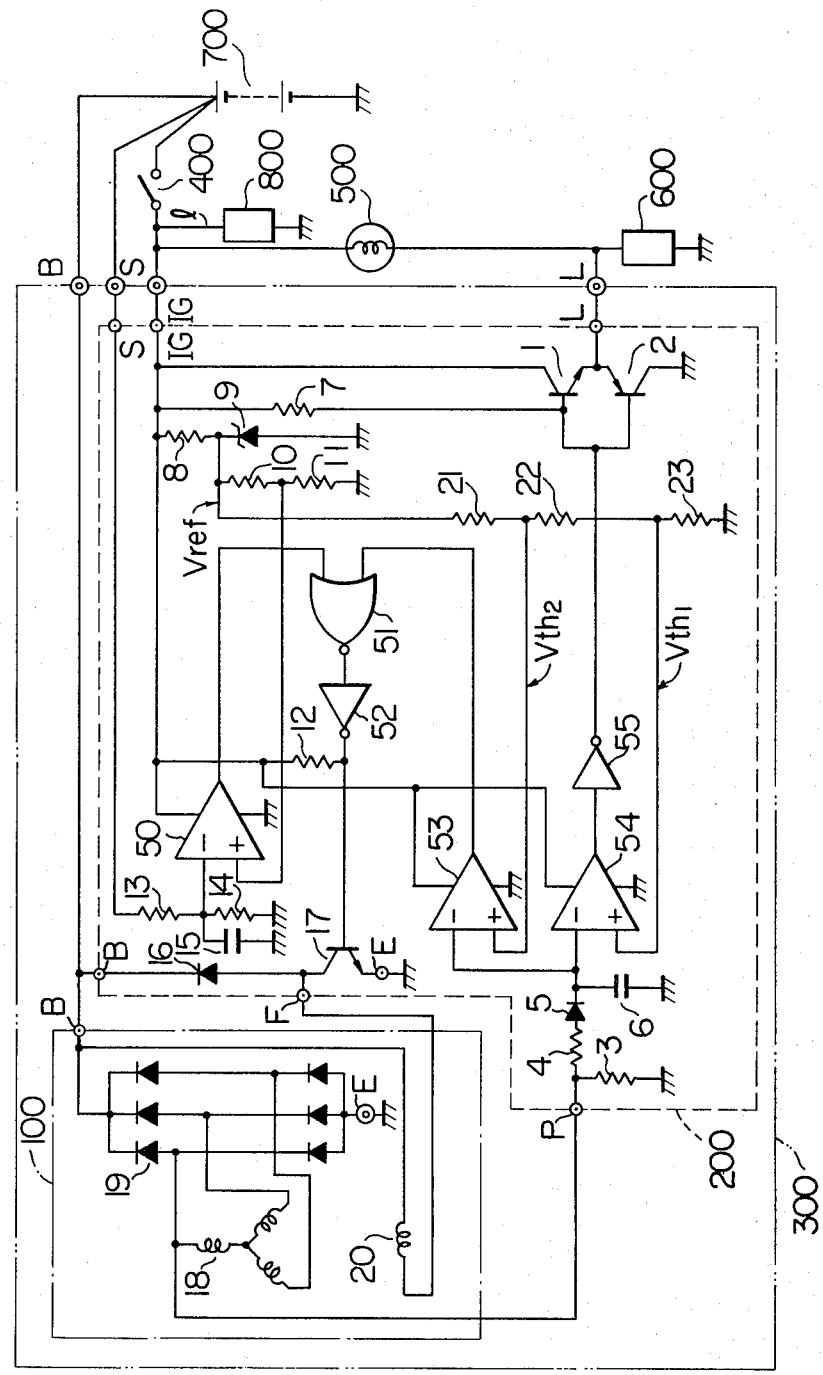
FIG. 1 is a general circuit diagram of an electric generating apparatus for vehicles.

An embodiment of the present invention will be described below with reference to the accompanying drawings.

In FIG. 1, reference numeral 300 designates an overall circuit of an electric generating apparatus for vehicles. Numeral 100 designates an AC generator comprising a stator winding 18, a field winding 20 and a full-wave rectifier 19. A rotor having the field winding 20 is rotated by an engine and the generated three-phase AC voltage is full-wave rectified to produce a DC output. Numeral 200 designates an electric generation control apparatus including an electric generation display part constituted by a circuit comprising resistors 3 and 4, a diode 5, a capacitor 6, a comparator 54, an inverter 55, transistors 1 and 2 and a resistor 7. When a key switch 400 is closed to supply an exciting current to the generator 100 and the engine starts its operation to cause the generator to start electric generation, a voltage across a battery 700 is detected directly through a terminals S. An internal reference voltage Vref established by a resistor 8 and a voltage regulator diode 9 is divided by resistors 10 and 11, and the resulting voltage is compared in a comparator 50 with a voltage value obtained by dividing the battery detection voltage from the terminal S by resistors 13 and 14. The output of the comparator 50 is used to effect on-off control of an output transistor 17 through a NOR circuit 51 and an inverter 52 thereby to maintain the electric generation voltage at a constant value, say, 14.5 volts. Namely, if the battery voltage is higher than a predetermined control voltage (14.5 volts, for example), the comparator 50 supplies a low level signal to the NOR circuit 51 as an input signal thereto. The other input signal to the NOR circuit 51 is an output signal from a comparator 53. The comparator 53 is a main element of the control apparatus of this invention. In the comparator 53, an input signal common to the comparator 54 formed by smoothing the P-terminal input signal (a rectangular wave input signal which is higher than the battery charge voltage by a forward voltage drop of one of the diodes constituting the full-wave rectifier 19 in the normal electric generating state) through a smoothing circuit comprising the resistors 3 and 4, the rectifying diode 5 and the smoothing capacitor 6, is compared with a predetermined second control voltage Vth2 which is obtained by dividing the internal reference voltage Vref by the resistors 21, 22 and 23 and represented by $Vth2 = Vref \cdot (R_{22}+R_{23})/(R_{21}+R_{22}+R_{23})$, where $R_{21}$, $R_{22}$ and $R_{23}$ are resistance values of the resistors 21, 22 and 23, respectively. If the smoothed input signal is higher than the second control voltage Vth2 (10 volts, for example), the comparator 53 outputs a low level signal, and vice versa. When the battery voltage is higher than the second control voltage Vth2 in the normal electric generating state, the comparator 53 naturally produces a low level signal. Therefore, since both input signals to the NOR circcuit 51 are both at low level, the output signal of the NOR circuit 51 is at high level. Thus, the output signal of the inverter 52 is at low level, so that the output transistor 17 becomes nonconductive, and the exciting current of the generator is cut off thereby to reduce the electric generation voltage. On the other hand, when the battery voltage is lower than the predetermined control voltage, the comparator 50 supplies a high level signal to the NOR circuit 51. As a result, regardless of the sign of the signal from the comparator 53, the NOR circuit 51 supplies a low level signal to the inverter 52, which in turn produces a high level signal. As a result, the output transistor 17 has its base biased positively through the resistor 12 and hence becomes conductive, and the exciting current is supplied to the generator thereby to increase its electric generation voltage. With the above-mentioned operation, the electric generation voltage of the generator 100 and thus the battery voltage is maintained constant.

In the electric generation display part, the comparator 54 compares the input signal recieved at the terminal P and smoothed by the smoothing circuit with a first control voltage Vth1 which is obtained by dividing the internal reference voltage Vref by the resistors 21, 22 and 23 and represented by $Vth1 = Vref \cdot R_{23}/(R_{21}+R_{22}+R_{23})$. The output signal of the comparator 54 is applied through the inverter 55 to the base circuit of the transistors 1 and 2 forming a push-pull circuit to control the push-pull circuit so that the display lamp 500 is turned off and an electric load 600 is energized through the output terminal L of the push-pull circuit during normal electric generation, while the display lamp 500 is turned on and the electric load 600 is de-energized when electric generation is not effected.

In other words, when the smoothed P-terminal input voltage is lower than a predetermined voltage (namely, the first control voltage Vth1 for controlling the electric generation display lamp, 8 volts, for example), corresponding to the state of no electric generation, the comparator 54 produces a high level signal and the signal is changed to low level through the inverter 55. Thus, the transistor 1 is turned off and the transistor 2 is turned on, so that the display lamp 500 is lit to inform the driver that electric generation is not effected. On the other hand, when electric generation is started and the smoothed P-terminal input voltage exceeds the first control voltage Vth1, the comporator 54 produces a low level signal and the signal is changed to high level through the inverter 55, so that the transistor 1 is turned on and the transistor 2 is turned off, thereby putting out the display lamp 500 connected to the output terminal L and energizing the electric load 600 such as an electric heating choke. The resistor 3 is a compensating resistor provided for the prevention of malfunction of the electric generation display part in response to a leakage current flowing from the terminal B of the generator 100 via the fullwave recitifier 19 to the terminal P. Numeral 7 designates a base resistor for the transistors 1 and 2.

The foregoing description relates to a normal operation of the electric generation control apparatus according to the present invention. Next, an explanation will be made of the operation of the control apparatus of this invention in an abnormal operational state with reference to FIG. 2. FIG. 2 (1) shows a battery voltage waveform whose portion from a point S to a point A represents a period of normal electric generation. In the period of normal electric generation, when the output transistor 17 of the electric generation control apparatus 200 is on, the electric generation voltage rises to the level of Vreg1, while, when the output transistor 17 is off, the electric generation voltage falls to the level of Vreg2 in the drawings. The difference between both levels, $Vreg1 - Vreg2 = V_{Hys}$, is called the hysteresis of the control voltage whose magnitude is generally about 0.1 to 0.2 volt. FIG. 2 (1) provides an enlarged respresentation of variations of the battery voltage. A corresponding collecter voltage waveform of the output transistor 17 is shown in FIG. 2 (2) as the F-terminal voltage waveform. When the output transistor 17 is on, the F-terminal voltage is equial to the saturation voltage $V_{CE(SAT)}$ of the transistor 17, while, when the output transistor 17 is off, it is nearly equal to the battery voltage, 14.5 volts, for example. Further, a corresponding exciting current $I_F$ flowing through the field winding 20 is shown in FIG. 2 (3). Upon conduction of the output transistor 17, the field current $I_f$ rises with a time constant determined by a large inductance of the field winding 20, while, upon cutting-off of the transistor 17, the field current $I_f$ falls with a time constant of the flywheel diode 16. The average value of the field current, which is dependent on the load condition of the electric generator, is generally approximately 1 ampere. A corresponding P-terminal voltage waveform is shown in FIG. 2 (4). The P-terminal voltage waveform is a rectangular waveform having a maximum value (14.5+0.6=15.1 volts, for example) which is higher than the battery voltage by a voltage drop across a diode of the full-wave rectifier 19 (0.6 volt, for example) and a minimum value (−0.6 volt, for example) which is lower than ground potential by the voltage drop across a diode. The frequency of the rectangular waveform is proportional to the rotational speed of the generator 100. If the rotational speed of the generator 100 is N rpm and the number of magnetic pole pairs is three, then the frequency $=N/60 \times 3 = N/20$ (Hz). Further, a corresponding voltage waveform at the terminal L is shown in FIG. 2 (5). In the normal electric generating state, the L-terminal voltage is about 13.5 volts, for example, which is lower than the battery voltage by the saturation voltage $V_{CE(SAT)}$ of the transistor 1 and operates to energize the electric load 600.

Now, assume that a part or the whole of the electric load 800 on the vehicle is cut off and the consumption of an output current from the generator 100 ceases at the point in FIG. 2 (1).

At this time, a surge voltage of the magnitude of $V_G$ occurs at the point B in FIG. 2 (1) thereby to overcharge the battery 700. An explanation will be made of the case where the comparator 53 is absent and the case where the comparator 53 is used.

(I) When the comparator 53 which is a main element of the present invention is absent from the control apparatus:

As shown in FIG. 2 (1), when the battery voltage reaches $V_G$, which is higher than Vreg1 because of the overcharge, the output transistor 17 is turned off as shown in FIG. 2 (2) and therefore the field current $I_F$ flowing through the field winding 20 decreases through the flywheel diode 16 with the time constant thereof as shown in FIG. 2 (3). Thus, the battery voltage waveform decreases with the time constant determined substantially by the field winding 20 toward the point C in FIG. 2 (1) and the corresponding point F in FIG. 2 (3) where the exciting current disappears and the electric generation stops completely.

After the complete stop of electric generation, the battery discharges according to the state of the electric load 800, with the result that the battery voltage waveform of FIG. 2 (1) falls from the point C to the point D, namely, until it reaches the level of Vreg2. In this period, the transistor 17 is cut off, and the exciting current $I_F$ continues to be zero from the point F to the point G shown in FIG. 2 (3) (the latter point G corresponding to the point D in FIG. 2 (1)). Further, in this period, the input voltage to the terminal P falls along with the fall of the waveform $I_F$ and finally reaches the level of Vth1 and below. Particularly, when $I_F$ is zero, the input voltage to the terminal P is a voltage generated only by the residual magnetic flux, and it is very low. When the input voltage to the terminal P reaches the level of Vth1 and below, the output of the comparator 54 supplies a low level signal to the base of the transistor 2, which causes the level of the output terminal L to be low and hence the display lamp 500 to be lit.

When the battery voltage tends to fall below the level of Vreg2, the output transistor 17 becomes conductive, thereby causing the exciting current to flow, so that the battery voltage waveform continues to rise according to the state of the electric load 800 as shown in FIG. 2 (1), namely, from the point D to the point E in the drawing. The exciting current rises from the point G to the point H in FIG. 2 (3). From the point H and after, there is repeated the same operation as that before the occurrence of the above-mentioned abnormal condition. In this period, as shown in FIG. 2 (4), the waveform of the input voltage to the terminal P exceeds the level of Vth1 at a point corresponding to a point midway between the points G and H of the $I_F$ waveform. Thus, as shown in FIG. 2 (5), even temporarily in the period when the input voltage to the terminal P becomes Vth1 and below, the transistor 2 becomes conductive, thereby causing the level of the L-terminal to become low and the display lamp 500 to be lit, which erroneously informs the vehicle driver of a state of no electric generation despite that the electric generating apparatus is in electric generating operation.

(II) When the comparator 53, which is a main element in the present invention, is used:

This case is indicated by the portions of FIG. 2 (2), 2 (3), 2 (4) and 2 (5) shown by alternate long and short dash lines. Even when the battery voltage rises due to overcharge or the like and the comparator 50 supplies a low level signal to the NOR circuit 51, the NOR circuit 51 continues to produce a signal determined by the output signal of the comparator 53. As a result, the output transistor 17 is on-off controlled by the output signal of the comparator 53. In other words, the output voltage of the generator 100 is controlled at a constant value in accordance with the detection voltage level Vth2 of the comparator 53. Here, since the level Vth2 is set to be higher than the level Vth1 which causes the display lamp to be lit, the input voltage to the terminal P can not become Vth1 and below. Therefore, the display lamp can not be lit. At this time, the exciting current $I_F$ is required to have a magnitude necessary only for effecting electric generation but not required to have a magnitude necessary for charging the battery. Also, in this time there is no necessity to supply an electric current to the electric load on the vehicle, and therefore the exciting current may be a pulsating current of very low level.

Further, when the battery voltage becomes lower than Vreg2, the comparator 50 supplies a high level signal to the NOR circuit 51, so that the output of the NOR circuit 51 takes low level. Thus, the base of the transistor 17 is supplied with a high level signal thereby to cause the exciting current to flow and consequently the battery voltage to rise. Thus, the above-mentioned operation is repeated. Therefore, it is possible to prevent the comparator 54 from effecting an incorrect operation in a normal electric generating state, namely, from causing the display lamp to be lit erroneously during continuing normal electric generation.

The foregoing explanation has been made of the operation of the control apparatus accoring to the present invention with reference to an extreme exemplifying case in which a part or the whole of the electric load on a vehicle is cut off. The present invention, however, is effective especially for use in a Diesel engine driven vehicle or the like which does not require any ignition apparatus. That is, in the absence of a constant load having a certain degree of magnitude, such as an ignition apparatus which causes the battery to discharge, the portion of the waveform between the C and D in FIG. 2 (1) tends to become a gentle curve, which inevitably invites an overcharging tendency. Since this results in a longer period during which the output transistor 17 is turned off, an opportunity of the occurrence of the condition of $I_F=0$ is raised, which increases the possibility that the input voltage to the terminal P becomes Vth1 and below.

It will be seen from the foregoing description that, according to the electric generation control apparatus for vehicles of this invention, even in the case of an electric generating apparatus for use in a Diesel engine driven vehicle or the like which does not require any particular ignition apparatus and tends to cause overcharge of a battery, or even in an extreme case where the electric load on a vehicle is cut off to cause instantaneous overcharge of a battery, it is possible to remove a drawback of incorrect lighting of an electric generation display lamp which erroneously informs the vehicle driver of a state of no electric generation during continiuing normal electric generating operation, since the apparatus of this invention uses a first electric generation control voltage (14.5 volts, for example) for maintaining the electric generation voltage at a constant level and effecting appropriate charging of the battery, as well as a second electric generation control voltage (10 volts, for example) which becomes active only when the battery voltage is higher than the first electric generation control voltage and which is higher than a control voltage (8 volts, for example) for lighting the electric generation display lamp.

Further, the electric generation display output of the electric generation control apparatus according to the present invention may be used not only for driving the electric generation display unit including the above-mentioned electric genration display lamp but also as one of input signals to a device for checking the operation of various parts of a vehicle or to a vehicle trouble shooting device.

We claim:

1. An apparatus for controlling electric generation for vehicles for use in an electric generating apparatus for a vehicle having a battery comprising a generator and an electric generation display device, said electric generation control apparatus comprising:

a first comparator circuit for receiving a detection value of a voltage of said battery and a first reference control voltage, comparing both input signal voltages with each other and producing a comparison output signal;

an electric generation display control circuit comprising a second comparator circuit for receiving a detection value of an electric generation voltage of said generator and a second reference control voltage, comparing both input signal voltages with each other and producing a comparison output signal, and a driver circuit having an input terminal connected to an output terminal of said second comparator circuit and an output terminal connected to said electric generation display device for driving said electric generation display device in response to the comparison output signal from said second comparator circuit;

a third comparator circuit for receiving the detection value of the electric generation voltage of said generator and a third reference control voltage higher than said second reference control voltage, comparing both input signal voltages with each other and producing a comparison output signal; and means for driving an exciter circuit connected to an output terminal of said first comparator circuit and an output terminal of said third comparator circuit and operating to drive said exciter circuit only in response to at least one of the comparison output signal of said first comparator circuit produced when the detection value of the battery voltage is lower than the first reference control voltage and the comparison output signal of said third comparator circuit produced when the detection value of the electric generation voltage of said generator is lower than the third reference control voltage;

whereby the detection value of the electric generation voltage of said generator is maintained at the third reference control voltage and above, thereby prohibiting the operation of said driver circuit of said electric generation display control circuit during a continuing electric generating operation of said generator, and wherein the output terminal of said driver circuit of said electric generation display control circuit is connected to a junction point of said electric generation display device and an electric load on said vehicle which are connected in series between a supply source of the battery voltage and ground, and said driver circuit alternately energizes and de-energizes said electric generation display device and said electric load on said vehicle respectively at the same time.

2. An electric generation control apparatus for an electric generating apparatus for a vehicle having an electric generator and a battery for controlling electric generation of said generator to charge said battery, said electric generation control apparatus comprising:

a first comparator circuit for receiving a detection value of a voltage of said battery and a first reference control voltage, comparing both input signal voltages with each other and producing a comparison output signal;

an electric generation display control circuit comprising a second comparator circuit for receiving a detection value of an electric generation voltage of said generator and a second reference control voltage, comparing both input signal voltages with each other and producing a comparison output signal, and a driver circuit having an input terminal connected to an output terminal of said second comparator circuit and an output terminal connected to a junction point of an electric generation display device of said vehicle and an electric load of said vehicle which are connected in series between a supply source of the battery voltage and ground, said driver circuit energizing said electric generation display device and deenergizing said electric load and deenergizing said electric generation device and energizing said electric load alternately at the same time, in response to a signal at the output terminal of said driver circuit responsive to the comparison output signal from said second comparator circuit;

a third comparator circuit for receiving the detection value of the electric generation voltage of said generator and a third reference control voltage higher than said second reference control voltage, comparing both input signal voltages with each other and producing a comparison output signal;

a gate circuit having input terminals connected to an output terminal of said first comparator circuit and output terminal of said third comparator circuit for generating a drive output signal only in response to at least one of the comparison output signal of said first comparator circuit produced when the detection value of the battery voltage is lower than the first reference control voltage and the comparison output signal of said third comparator circuit produced when the detection value of the electric generation voltage of said generator is lower than the third reference control voltage; and an exciter circuit for receiving the drive output signal from said gate circuit and causing said eledtric generator to effect electric generation, whereby the detection value of the electric generation voltage of said generator is maintained at the third reference control voltage when the detection value of the battery voltage is not lower than the first reference control voltage, thereby causing said driver circuit to continue to stop the driving of said electric generation display device.

3. An electric generation control apparatus according to claim 2, wherein said exciter circuit comprises an output transistor circuit for energizing a fielding winding of said electric generator.

4. An electric generation control apparatus for an electric generating apparatus for a vehicle having an electric generator and a battery mounted thereon for controlling electric generator charging of said battery, said electric generation control apparatus comprising:
  (a) first control means for detecting a voltage of said battery and controlling electric generation of said electric generator to make the battery voltage equal to a reference control voltage, said first control means comprising first comparator means for comparing the voltage of said battery with the reference control voltage and exciter means for energizing a field winding of said electric generator in response to an output signal from said first comparator means;
  (b) electric generation display control means for controlling a display device of said vehicle, said electric generation display control means operating to detect an electric generation voltage of said generator and to drive said display device when the generator voltage is lower than a first pre-set voltage, thereby making said display device display a state of no electric generation, said display control means comprising a second comparator means for comparing the generator voltage with the first pre-set voltage and driver means for driving said display device in response to an output signal from said second comparator means, an output of said driver means being connected to a junction point of said display device and an electric load of said vehicle which are connected in series between a voltage supply source of said battery and ground, said driver means energizing said display device and deenergizing said load and deenergizing said display device and energizing said load alternately at the same time; and
  (c) second control means for causing said generator to effect electric generation to make the generator voltage equal to a second pre-set voltage when the battery voltage is not lower than the reference control voltage and said first control means controls to stop electric generation of said generator such that the generator voltage falls to the second pre-set voltage which is higher than the first pre-set voltage.

5. An electric generation control apparatus according to claim 4, wherein said second control means comprises third comparator means for comparing the electric generation voltage of said electric generator with the second preset voltage and said second control means is constructed to control the energizing operation of said exciter means of said first control means in response to an output signal from said third comparator means, whereby the electric generation voltage of said electric generator is maintained to be equal to the second preset voltage when the voltage of said battery is not lower than the reference control voltage, thereby causing said driver means of said electric generation display control means to continue to stop the driving of said electric generation display device.

* * * * *